US012714626B2

(12) United States Patent
Panizzolo

(10) Patent No.: US 12,714,626 B2
(45) Date of Patent: Aug. 25, 2026

(54) APPARATUS FOR ASSISTED MOBILITY

(71) Applicant: MOVEO SRL, Padua (IT)

(72) Inventor: Fausto Antonio Panizzolo, Padua (IT)

(73) Assignee: MOVEO SRL, Padua (IT)

( * ) Notice: Subject to any disclaimer, the term of this patent is extended or adjusted under 35 U.S.C. 154(b) by 623 days.

(21) Appl. No.: 18/251,843

(22) PCT Filed: Nov. 4, 2021

(86) PCT No.: PCT/EP2021/080605
§ 371 (c)(1),
(2) Date: May 4, 2023

(87) PCT Pub. No.: WO2022/096555
PCT Pub. Date: May 12, 2022

(65) Prior Publication Data

US 2023/0404836 A1 Dec. 21, 2023

(30) Foreign Application Priority Data

Nov. 5, 2020 (IT) ........................ 102020000026362

(51) Int. Cl.
*A61H 1/02* (2006.01)
*A61H 3/00* (2006.01)

(52) U.S. Cl.
CPC ............. *A61H 1/0244* (2013.01); *A61H 3/00* (2013.01); *A61H 2003/007* (2013.01); *A61H 2201/1261* (2013.01); *A61H 2201/1628* (2013.01); *A61H 2201/1642* (2013.01); *A61H 2201/1652* (2013.01); *A61H 2201/5053* (2013.01)

(58) Field of Classification Search
CPC ................................ A61H 1/0244; A61H 3/00
See application file for complete search history.

(56) References Cited

U.S. PATENT DOCUMENTS 2,772,674 A * 12/1956 Swiech ................. A61F 5/0102 602/23
4,524,760 A * 6/1985 Lerner ................... A61H 19/50 128/845

(Continued)

FOREIGN PATENT DOCUMENTS

CN 105263448 A 1/2016
CN 105992554 A 10/2016

(Continued)

OTHER PUBLICATIONS

Translation RU 2054907.*

(Continued)

*Primary Examiner* — Shaun R Hurley
(74) *Attorney, Agent, or Firm* — CANTOR COLBURN LLP

(57) ABSTRACT

An apparatus for assisted mobility, which includes a harness to be worn on the torso of a user and at least one band to be worn around a leg of the user, above the knee, and a connecting device for connecting the harness with the at least one band, which in turn includes at least one spring adapted to pass from a relaxed state or from a first state of tension to a second state of tension during walking or other movements of the user, and elements for pre-tensioning the spring.

9 Claims, 6 Drawing Sheets

(56) References Cited

U.S. PATENT DOCUMENTS

| | | | | | |
|---|---|---|---|---|---|
| 5,308,305 | A * | 5/1994 | Romney | A63B 21/4021 | 482/121 |
| 5,993,362 | A * | 11/1999 | Ghobadi | A63B 21/4015 | 482/121 |
| 6,428,495 | B1 * | 8/2002 | Lynott | A61F 5/3715 | 602/23 |
| 9,186,536 | B2 * | 11/2015 | Strachan | A63B 21/0557 | |
| 11,116,654 | B2 * | 9/2021 | Massimiani | A61F 5/028 | |
| 2004/0116260 | A1 * | 6/2004 | Drennan | A63B 21/0552 | 482/131 |
| 2005/0279797 | A1 * | 12/2005 | Martin | A45F 3/14 | 114/39.18 |
| 2019/0030708 | A1 | 1/2019 | Holgate et al. | | |
| 2019/0380904 | A1 | 12/2019 | Panizzolo et al. | | |
| 2021/0128390 | A1 * | 5/2021 | Choi | A61H 3/00 | |

FOREIGN PATENT DOCUMENTS

| | | | | |
|---|---|---|---|---|
| CN | 110352050 | A | 10/2019 | |
| RU | 2054907 | C1 * | 2/1996 | A63B 21/4025 |
| WO | 2014194257 | A1 | 12/2014 | |
| WO | 2019245633 | A1 | 12/2019 | |

OTHER PUBLICATIONS

International Search Report for International Application No. PCT/EP2021/080605, dated Feb. 1, 2022, 4 pages.

Written Opinion for International Application No. PCT/EP2021/080605, dated Feb. 1, 2022, 5 pages.

Chinese Office Action for Application No. 202180074924.4, dated Aug. 29, 2025, 13 pages with translation.

* cited by examiner

APPARATUS FOR ASSISTED MOBILITY

CROSS-REFERENCE TO RELATED APPLICATIONS

This application is a 35 U.S.C. § 371 National Stage patent application of PCT/EP2021/080605, filed on 4 Nov. 2021, which claims the benefit of Italian patent application 102020000026362. filed on 5 Nov. 2020, the disclosures of which are incorporated herein by reference in their entirety.

TECHNICAL FIELD

The present disclosure relates to an apparatus for assisted mobility.

BACKGROUND

The sector to which the disclosure relates is mobility aids, which are designed to help people with reduced mobility to walk, by reducing fatigue and the loads on the joints.

The category of persons with reduced walking capacity often includes the elderly and persons with neurodegenerative disorders or other problems linked to injuries, who may have experienced a reduction in muscle mass, thus inevitably reducing walking speed. With aging, furthermore, also comes a reduction in stability and a consequent increase of the risk of falls.

Robotic aid devices are known for improving walking and reducing the risk of falls, which are powered by electromechanical actuators that apply a torque, thus assisting the joints of the user wearing the device. Such devices usually incorporate wearable sensors and means of detecting the different phases of human walking, so as to apply the correct electromechanical assistance.

Such devices are not devoid of drawbacks, such as the presence of rigid structures and the presence of electronics and batteries, which render their use rather impractical.

These drawbacks have been solved with the apparatus described in WO2019245633, in the name of Moveo Srl.

According to this document, the apparatus consists of a harness to be worn around the trunk and of a band or a pair of bands for support, each one to be worn around a leg, and associated with the harness via a respective elastic element, i.e. an elastically deformable element, which is adapted to work being extended during walking or other movements of the body. The elastic elements store and release mechanical energy at each step in order to provide an additional torque over and above the natural torque due to the movement. This use of energy helps users of any level of mobility to increase the force of the hip joint for some users who have particularly reduced mobility.

The bands can be worn both simultaneously or separately and in different positions, based on the needs of the user, for example around the thigh or the knee and/or the lower part of the leg.

The elastic element has a broad and flat shape structure to maintain a reduced encumbrance. In use, it extends preferably along the front part of the leg, or alternatively along the rear part. A connecting element at the upper end (when in use) of the elastic element, connects it to a length-adjustable belt, via a ratchet or a buckle. Adjusting the length of the belt can preload the elastic element. Another connecting element joins the upper end of the belt to the harness and translates along it for adjusting the position of the elastic element along the leg.

This apparatus has been appreciated by users and as a result of feedback the aims of the apparatus have been improved.

SUMMARY

The aim of the present disclosure is to provide an apparatus for assisted mobility, which is capable of improving the known art in one or more of the abovementioned aspects.

Within this aim, the disclosure provides an apparatus for assisted mobility that ensures the correct release of energy during walking, while being easy to adjust as a function of the requirements of the user.

The disclosure also provides an apparatus for mobility that is comfortable for the user.

- the present disclosure further overcomes the drawbacks of the background art in a manner that is alternative to any existing solutions.
- the disclosure also provides an apparatus that is highly reliable, easy to implement and low-cost.

This aim and these and other advantages which will become more apparent hereinafter are achieved by providing an apparatus for assisted mobility, which comprises a harness to be worn on the torso of a user and at least one band to be worn around a leg of said user, above the knee, said apparatus being characterized in that it comprises a connecting device for connecting said harness with said at least one band, which in turn comprises:

- at least one spring adapted to pass from a relaxed state or from a first state of tension to a second state of tension during walking or other movements of the user,
- means for pre-tensioning said spring.

BRIEF DESCRIPTION OF THE DRAWINGS

Further characteristics and advantages of the disclosure will become more apparent from the description of a preferred, but not exclusive, embodiment of the apparatus according to the disclosure, which is illustrated by way of non-limiting example in the accompanying drawings wherein.

DETAILED DESCRIPTION OF THE DRAWINGS

Figure 2:
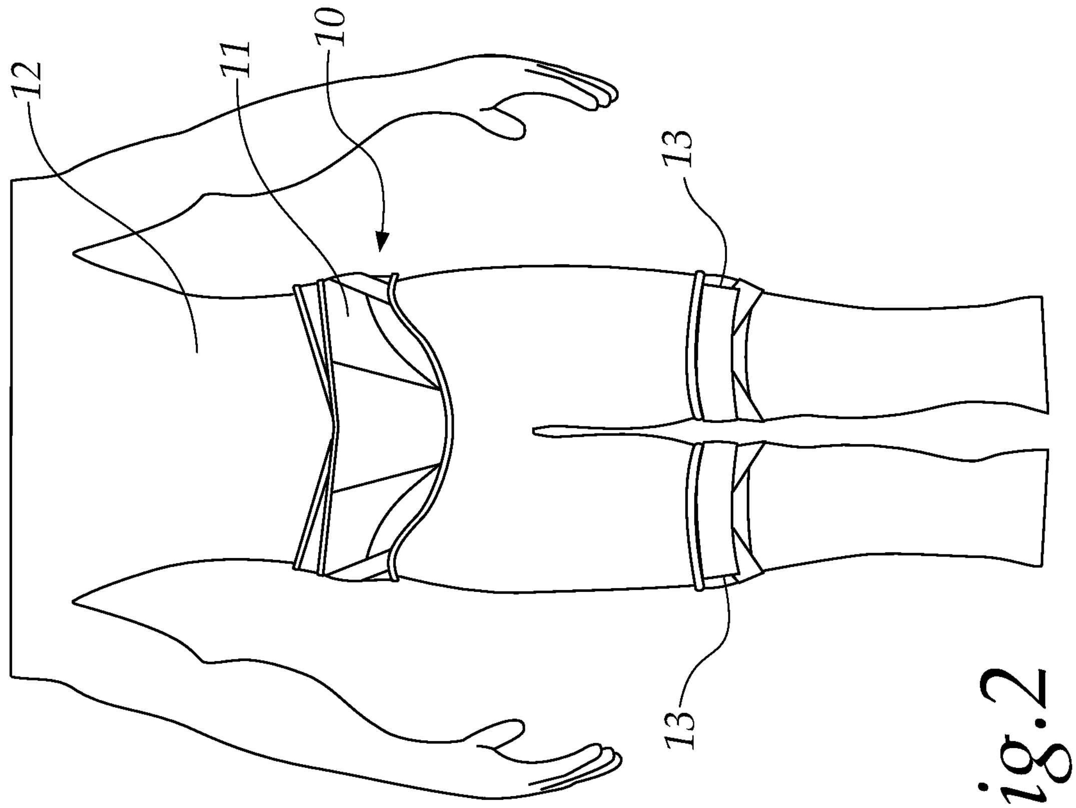
FIG. 2 is a rear elevation view of the apparatus according to the disclosure worn by a user.

With reference to the figures, the apparatus according to the disclosure, generally designated by the reference numeral 10, comprises a harness 11 to be worn on the torso of a user 12 and at least one band 13 to be worn around a leg of said user 12, above the knee and without affecting the latter. In particular, the apparatus 10 is normally provided and used with two bands 13, each one of these to be worn around a respective leg. The apparatus 10 comprises a connecting device 14 for connecting the harness 11 with the respective band 13; one device 14 is necessary for each band 13. The former in turn, comprises:

at least one spring 15 adapted to pass from a relaxed state or from a first state of tension to a second state of tension during walking or other movements of the user, means 16 for pre-tensioning the spring 15.

Figure 3:
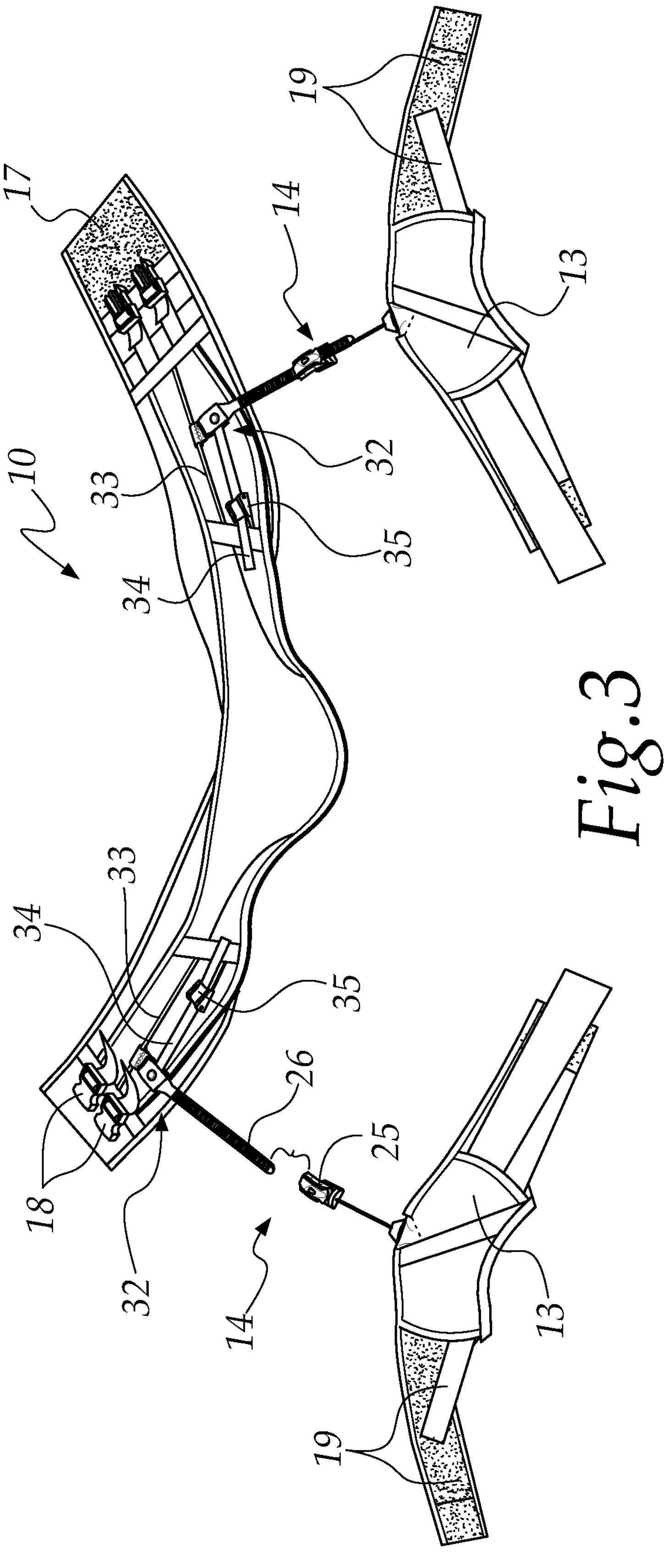
FIG. 3 is a perspective view of the apparatus according to the disclosure.

The harness 11 and the bands 13 are provided with adapted closure means, like VELCRO® hook and loop fasteners 17 and snap-acting buckles 18, for the former, and a system of VELCRO® hook and loop fasteners 19 for the latter, indicated in FIG. 3, with which it is possible to adjust the width thereof as a function of the size of the torso and of the legs of the user 12.

Figure 4:
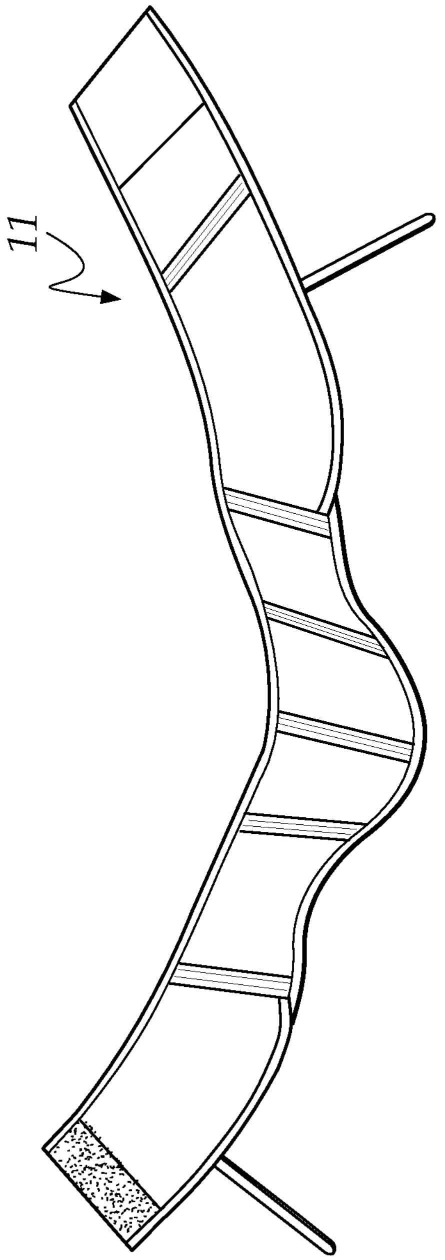
FIG. 4 is a perspective view of the harness.
Figure 5:
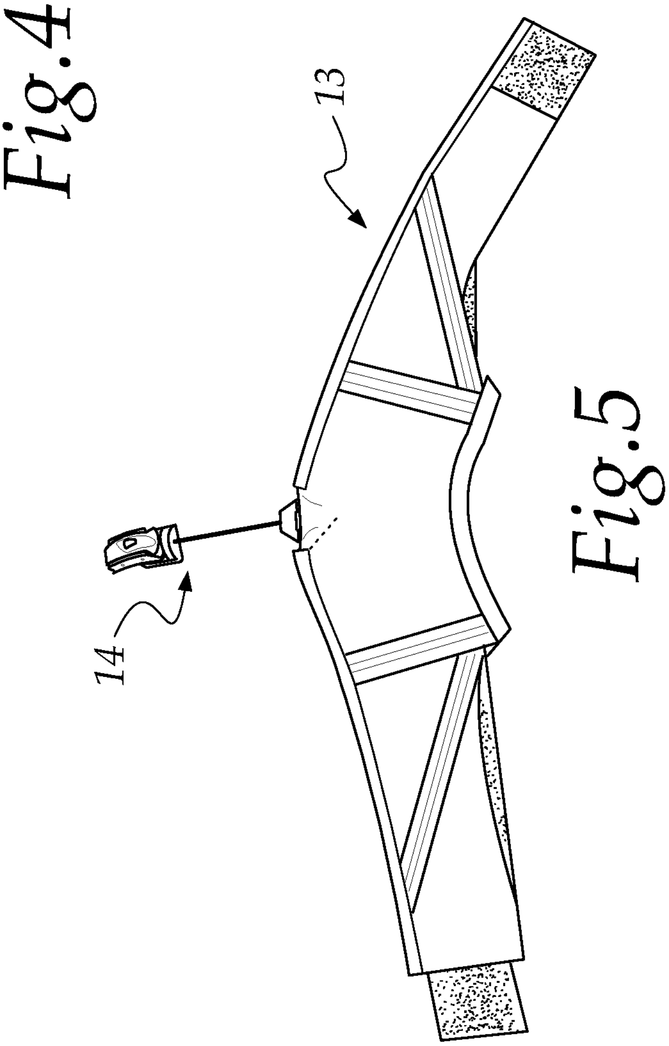
FIG. 5 is a perspective view of a band and a connecting device.

FIGS. 4 and 5 show the innermost side of the harness 11 and of a band 13, with the device 14, designed to be in contact with the body of the user. The system of VELCRO® hook and loop fasteners 19 creates an overlapping of layers on the outermost side and not on the innermost side, in order to render use of the band more comfortable.

As can be seen in FIGS. 7 to 10, which show at least one part of a connecting device in three different versions, 14, 114 and 214, the spring 15 is of the helical type. There can be a single spring 15, of suitable length, or a series of springs in succession for the necessary length. In particular, FIGS. 7 and 8 also show a part of the connection with a band 13.

The spring 15 is preferably, but not exclusively, of the helical type. It can in fact have an alternative geometry, different from helical.

Figure 1:
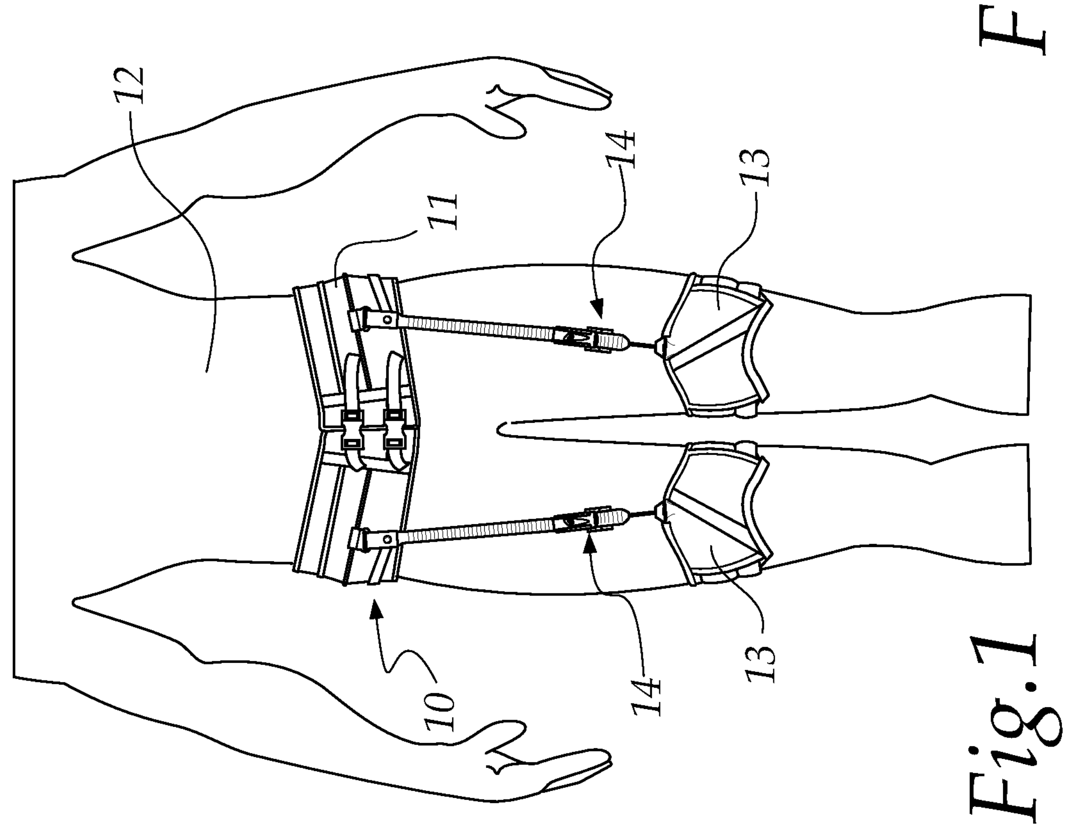
FIG. 1 is a front elevation view of the apparatus according to the disclosure worn by a user.

The device, in all its versions, is adapted to be positioned along the leg of the user, as shown in FIG. 1, for example along the femoral quadriceps.

In addition, the apparatus 10 comprises an insert 20 inside the band 13 with a hole 21 which is open toward the outside of the band 13, in the part directed upward when worn, and accommodating the spring 15, and also comprises a screw plug 22, with a through hole, to be screwed onto the insert 20 at the hole 21. In an alternative version, not shown, the insert can be inside the harness with the hole open toward the outside of the harness, in the part directed downward when worn. Substantially the device, together with the other elements described below, can be installed in the reverse position with respect to what is shown.

In all the variations, the connecting device 14, 114, 214 comprises a non-extendable cable 23 and passes through the insert 20, the plug 22 and the spring 15, and is connected at one end with the spring 15 and at the other end with the means for pre-tensioning 16.

The spring 15 can move with respect to the band 13, in compression and in extension, inside the insert 20.

In particular, the apparatus 10 comprises a block 24 at the end of the cable 23 that lies inside the insert 20, which with the plug 22 defines an accommodation space for the spring 15 in the relaxed state. The cable 23 extends inside the spring 15.

The means for pre-tensioning 16 comprise a ratchet element, indicated with 25, 125 and 225 in the different variations.

In the first variation of the connecting device 14, the ratchet element comprises a buckle with means for opening and release, which are conventional per se, which is coupled to a toothed strip 26 (indicated in FIG. 3) which extends downward from the harness 11 along the leg, when the apparatus 10 is worn.

The buckle is coupled to a connecting element 27 to which the cable 23 is joined at the end opposite from the end connected with the spring 15.

Also in the first variation, the section of cable 23 comprised between the insert 20 and the connecting element 27 is covered with a sheath 28, which protects the user 12 from direct contact with the cable 23.

Figure 8:
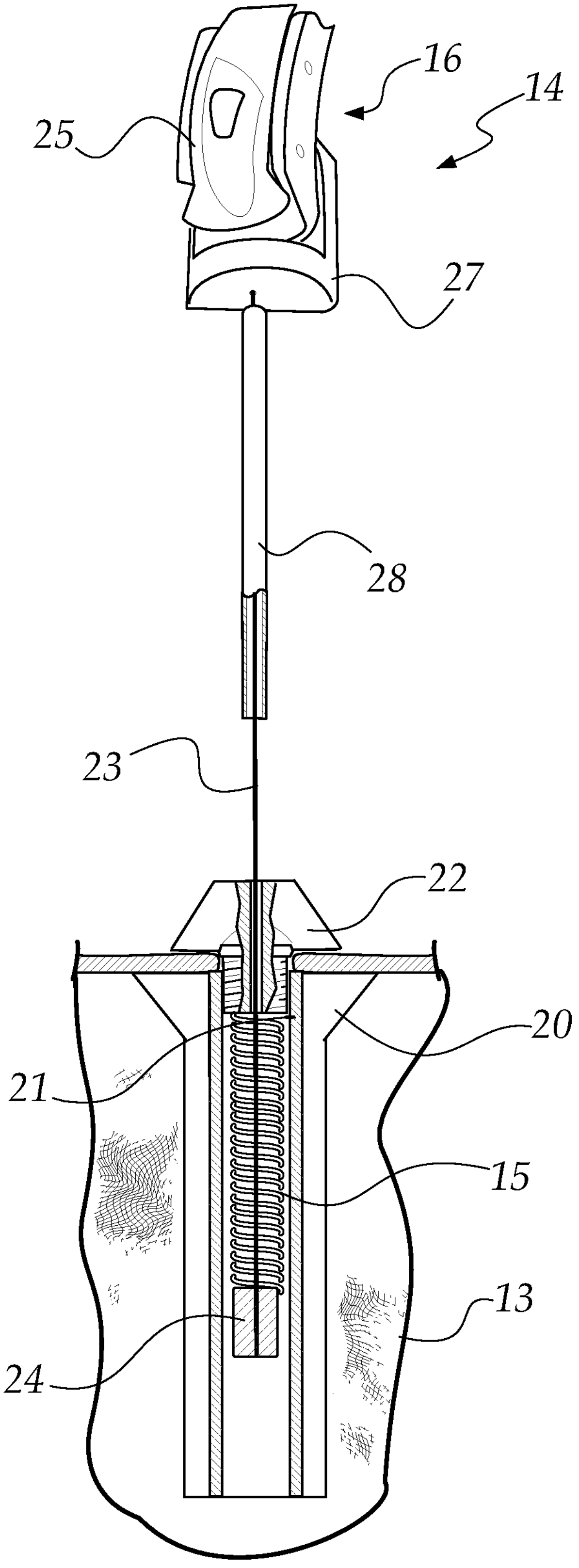
FIG. 8 is a view of the same part of the apparatus as in FIG. 7, with the spring in the state of tension.

The translation of the buckle along the toothed strip 26, in the direction of the harness 11, makes it possible to shorten the connection with the band 13, in order to adapt the apparatus 10 to the user, and/or to pre-tension the spring 15, as shown in FIG. 8. In this case the cable 23 is pulled in translation, bringing the block 24 with it, which compresses the spring 15 against the plug 22.

Figure 9:
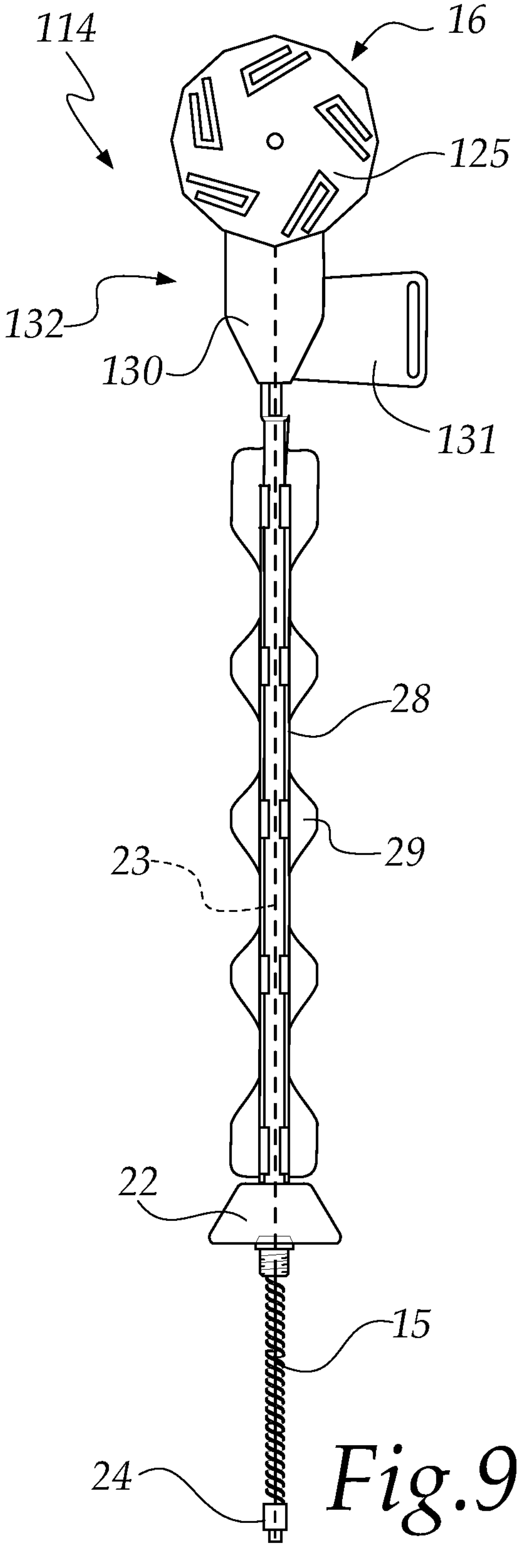
FIG. 9 is a view of a variation of the connecting device.
Figure 10:
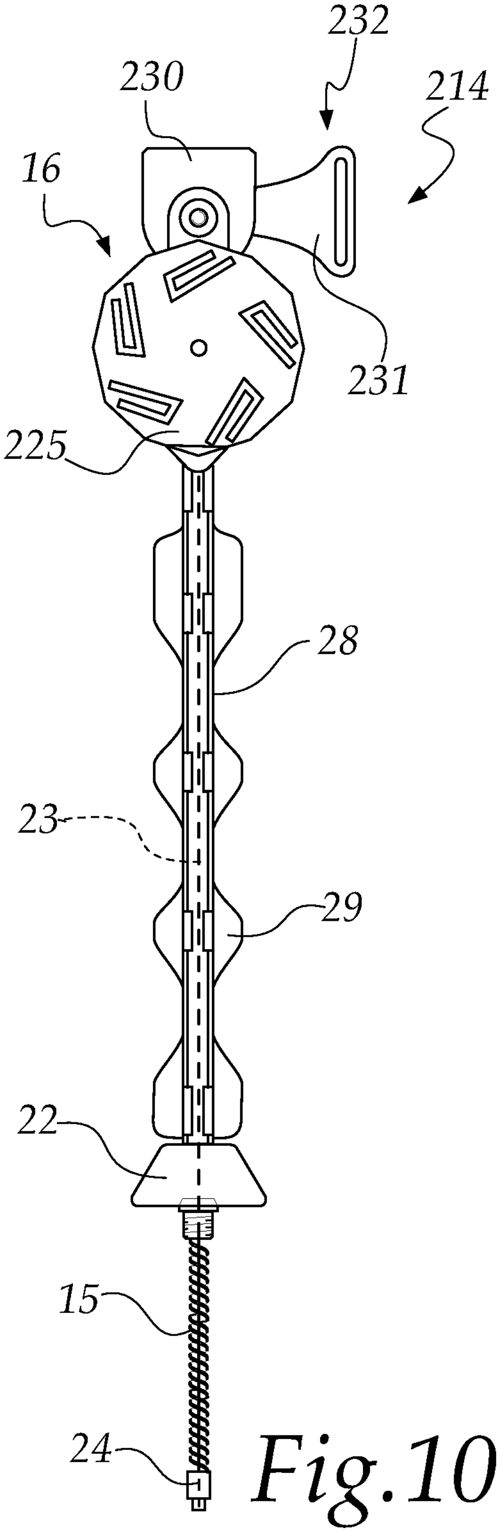
FIG. 10 is a view of another variation of the connecting device.

In the second version, shown in FIG. 9, the ratchet element 125 comprises a wheel which is adapted to determine, with its rotation, the winding, one click after another, of the cable 23, in this case too in order to adjust the length of the connection 10 depending on the user and/or as a function of the pre-tensioning requirements.

The lower part of the device 114 (from the plug downward, with respect to the position of use and with respect to the position shown), for mating with the band 13, is the same as in the previous version.

In this case too there is a sheath 27 for the cable 23 and there is also a flat rear element 29 that renders contact with the leg more comfortable.

Also present, proximate to the wheel, is a channel-like element 130 and another element 131 with a slot, the function of which will become clear below.

The third version of the connecting device 214 differs from the previous one substantially only in that the position of the last two elements cited, here numbered 230 and 231, is in a higher position than the ratchet element 225, i.e. the wheel.

The apparatus 10 advantageously comprises adjustment means 32, 132, 232 for adjusting the position of the connecting device 14, 114, 214, along the leg of the user 12, for example so that the device is positioned along the femoral quadriceps.

In particular, such adjustment means 32, 132, 232 comprise a guide 33 (indicated in FIG. 3 and in FIG. 6) on the harness 11 on which the connecting device 14, 114, 214 is adapted to slide by way of a channel-like element 30, 130, 230.

The adjustment means 32, 132, 232 also comprise a tape 34 which is length-adjustable and is coupled to the harness 11 by way of a buckle 35 and is connected at one end to the connecting device 14, 114, 214.

Figure 6:
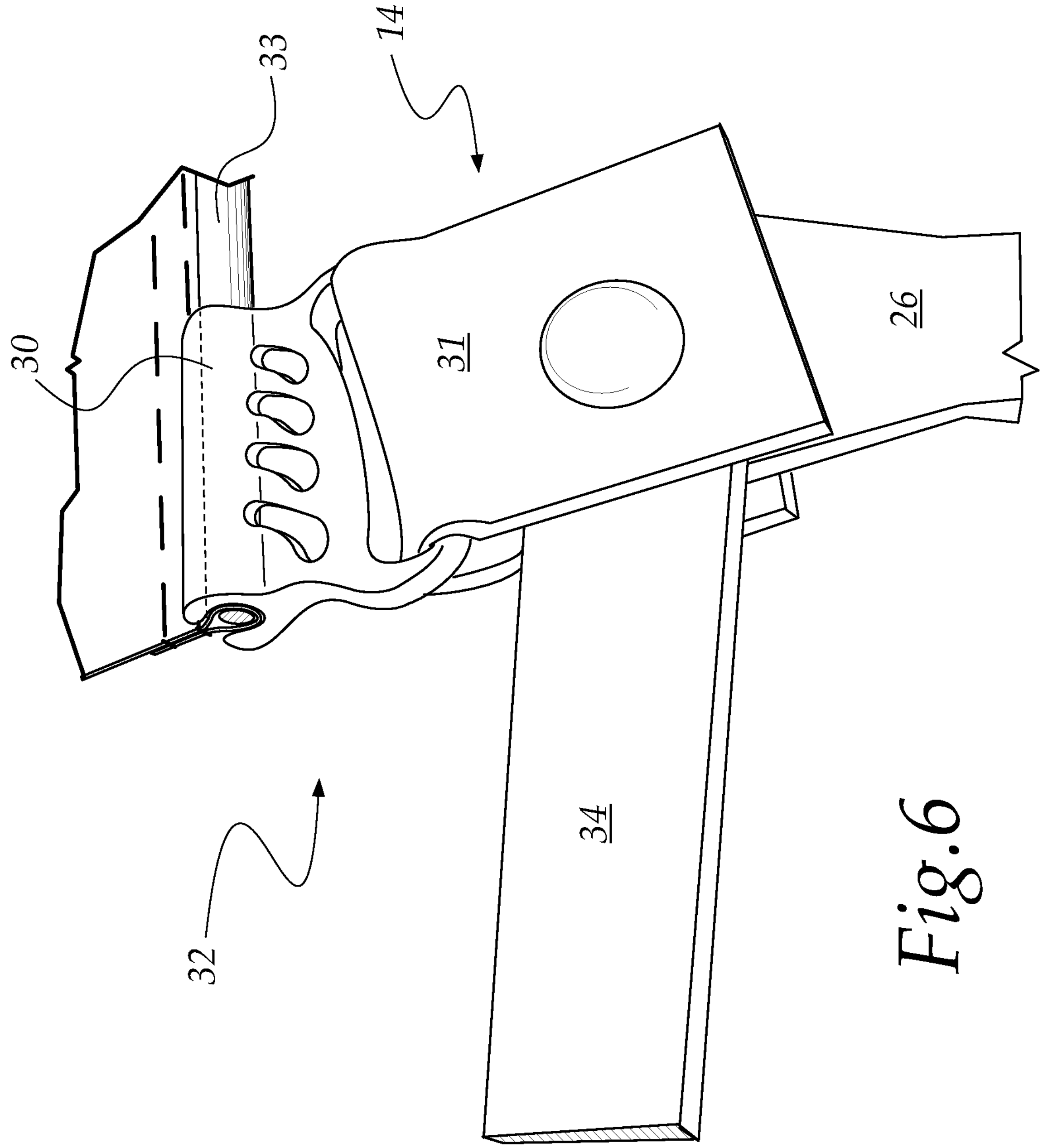
FIG. 6 is an enlarged detail of the apparatus according to the disclosure.
Figure 7:
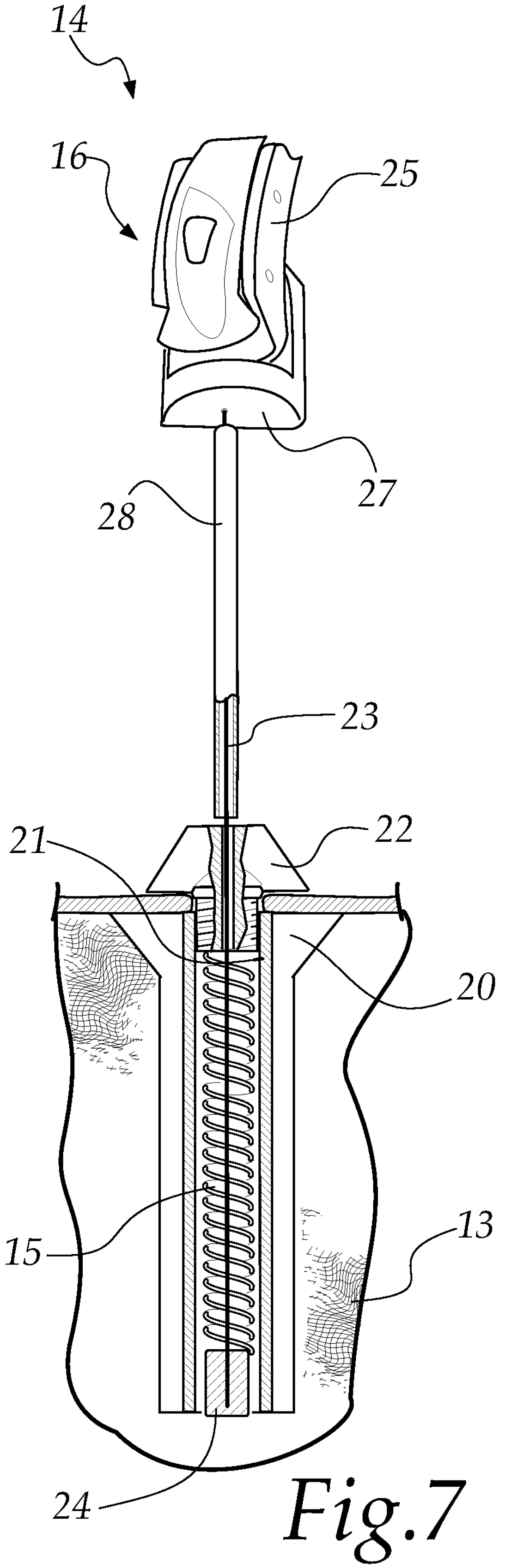
FIG. 7 is a view of a part of the apparatus according to the disclosure, with the spring in the relaxed state.

In the first version of the device 14, the part of the adjustment means 32 is shown in FIG. 6, where the guide 33, the channel-like element 31 and the tape 34 are indicated.

For the second and third versions, the channel-like element 130, 230 and the element 131 and 231 have a different shape but are connected to the harness 11 in the same way as in the first version.

The adjustment means 32 and the ratchet element 25, 125 and 225, to which the cable 23 is connected, render the latter integral with the harness 11.

In other possible versions, not shown, the connecting device can comprise a threaded insert and an externally-threaded tubular element, which accommodates the spring, inserted in the insert. The tubular element is screwed at one end portion thereof to the plug and at the opposite end portion to the threaded insert. The tubular element and the threaded insert are inserted and screwed into the insert mentioned above in the preceding versions and indicated in them with 20. The threaded insert is made, preferably, of brass and has a through opening for the spring and the cable. Alternatively, it can be made of other materials, for example of another metallic material or of plastic material.

This construction variation protects the components subjected to friction and contact during use of the apparatus, like the spring and the cable, from wear.

Use of the apparatus 10 according to the disclosure is evident from the foregoing description and explanation and, in particular, it is evident that it is easily adjustable, in addition to being less cumbersome during use than other conventional apparatuses. In addition, it is evident that the apparatus, which is easily adjustable, can be worn with the device between the trunk and a portion of leg, above the knee, so that the spring, inside the band, stores energy during the movements of the user, such as during the strides of walking. The spring can be compressed and return to the relaxed or pre-tensioned state, releasing the energy stored in order to assist the flexion and extension of the leg.

In practice it has been found that the disclosure fully achieves the intended aim and advantages by providing an apparatus that is comfortable to wear and to adjust, even during the performance of activities by the user, not particularly cumbersome even under clothing and at the same time capable of ensuring the correct release of energy during walking, as a function of the requirements of the user.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The invention claimed is:

1. An apparatus for assisted mobility, which comprises a harness to be worn on the torso of a user, and at least one band to be worn around a leg of said user, above the knee, said apparatus further comprising a connecting device for connecting said harness with said at least one band, which in turn comprises:

at least one spring adapted to pass from a relaxed state or from a first state of tension to a second state of tension during walking or other movements of the user, and pre-tensioning means configured for pre-tensioning said spring, said apparatus further comprising an insert inside one or both of said harness and said band, with a hole which is open at least toward an outside of said harness or of said band and accommodates said spring, and a screw plug, with a through hole, to be screwed onto said insert at said hole, said connecting device further comprising a cable which passes through said insert and said screw plug and is connected at one end to said spring and at an opposite end with said pre-tensioning means configured for pre-tensioning said spring.

2. The apparatus according to claim 1, wherein said spring is helical.

3. The apparatus according to claim 1, further comprising a block at the end of said cable which with said screw plug defines an accommodation space for said spring in the relaxed state, said cable extending inside said spring.

4. The apparatus according to claim 1, wherein said pre-tensioning means configured for pre-tensioning said spring comprise a ratchet element.

5. The apparatus according to claim 1, further comprising adjustment means configured for adjusting a position of said connecting device along the leg of the user, which comprise a guide on said harness and on which said connecting device is adapted to slide by a channel element.

6. The apparatus according to claim 5, wherein said adjustment means comprise a tape which is length-adjustable and is coupled to said harness by a buckle and is connected at one end to said connecting device.

7. The apparatus according to claim 4, wherein said ratchet element comprises a buckle.

8. The apparatus according to claim 4, wherein said ratchet element comprises a wheel.

9. The apparatus according to claim 1, wherein said connecting device comprises a threaded insert and a tubular element which are both inserted into said insert, said tubular element accommodating said spring.

* * * * *